United States Patent [19]

Plumb

[11] 4,334,590
[45] Jun. 15, 1982

[54] QUICK DISENGAGEMENT APPARATUS FOR WHEEL DRIVE MECHANISMS

[75] Inventor: Bruce E. Plumb, Salinas, Calif.
[73] Assignee: Bud Antle Inc., Salinas, Calif.
[21] Appl. No.: 122,504
[22] Filed: Feb. 19, 1980
[51] Int. Cl.³ .............................................. B60K 17/26
[52] U.S. Cl. ..................... 180/247; 74/391; 74/789; 180/70 R; 192/89 A
[58] Field of Search ............... 180/247, 70 R; 74/391, 74/705, 801, 789, 792, 335, 352, 353; 192/89 A, 93 A

[56] References Cited

U.S. PATENT DOCUMENTS

| 3,459,070 | 8/1969 | Holdeman | 74/705 |
| 3,753,479 | 8/1973 | Williams | 192/89 A |
| 4,043,226 | 8/1977 | Buuck | 180/247 |
| 4,116,320 | 9/1978 | Quilliam | 192/89 A |

*Primary Examiner*—Robert R. Song
*Assistant Examiner*—Donn McGiehan
*Attorney, Agent, or Firm*—Townsend and Townsend

[57] ABSTRACT

In a wheel drive mechanism adapted to produce high torque, low speed power to the wheel through a gearing system that includes a sun gear and a plurality of planetary pinion gears meshed therewith, a mechanism for disengaging the sun gear to ready the vehicle for high speed travel over a highway. The sun gear is supported on a drive shaft that has an elongated splined portion so that the sun gear can be moved axially into a position at which it is disengaged from the planetary pinion gears. A spring biases the sun gear into engagement with the planetary pinion gears and there is mechanism for controllably sliding the sun gear along the splined shaft portion against the spring. The mechanism is accessible from the exterior of the wheel hub, is fast acting and provides for locking the sun gear in either its engaged position or disengaged position.

4 Claims, 4 Drawing Figures

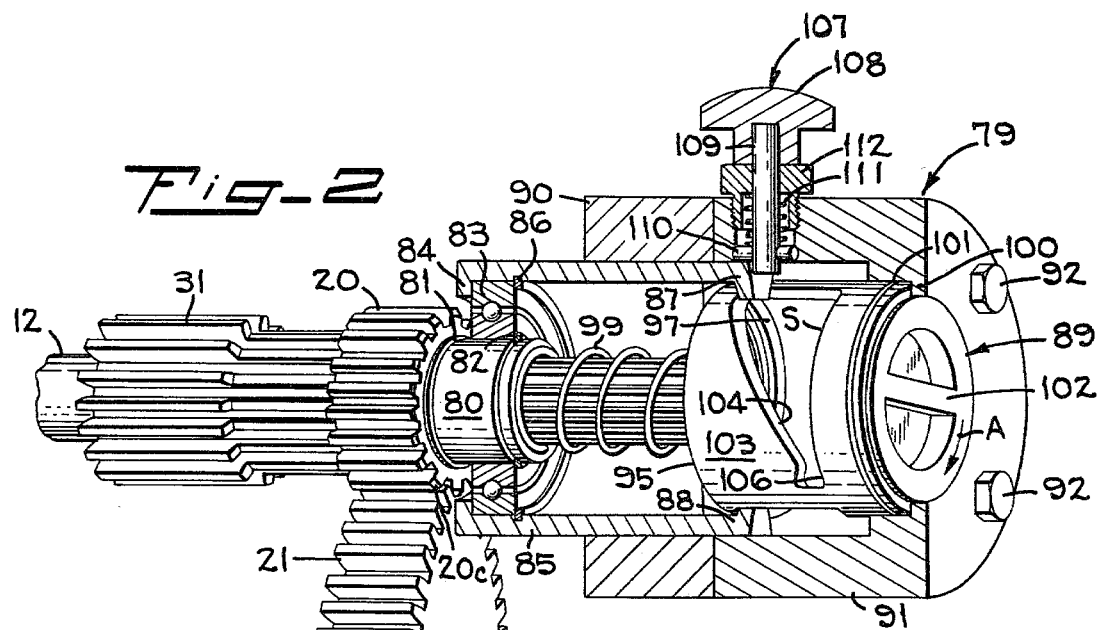
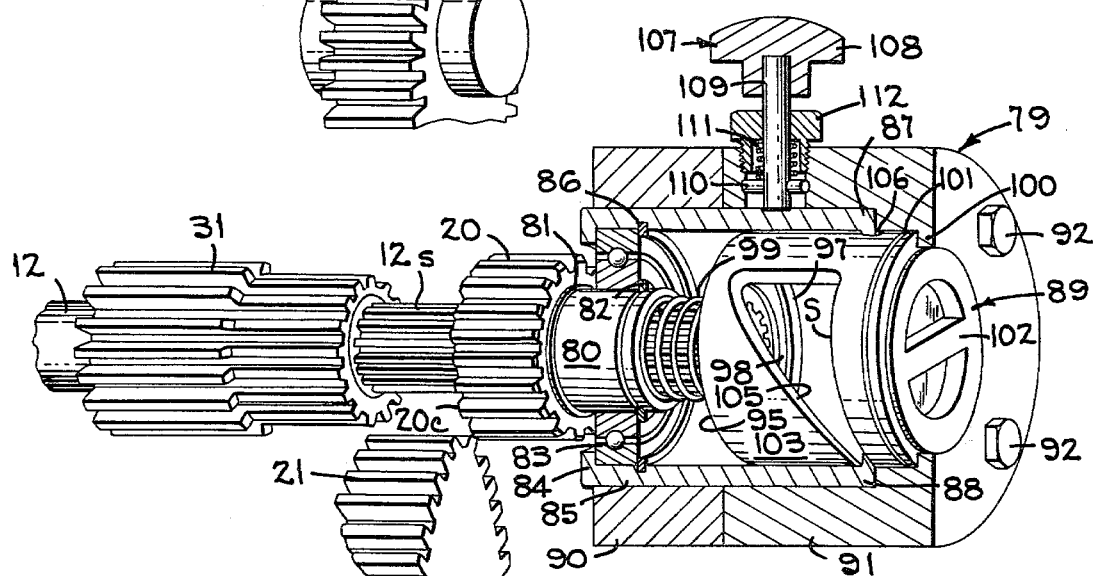
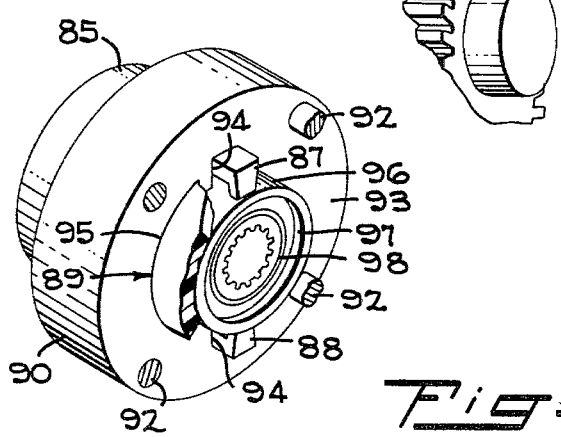

QUICK DISENGAGEMENT APPARATUS FOR WHEEL DRIVE MECHANISMS

BACKGROUND OF THE INVENTION

1. Field of the Invention

This invention relates to a mechanism for disengaging the gears in a planetary transmission mounted within a wheel hub for facilitating high speed movement of the vehicle on which the mechanism is mounted.

2. Description of the Prior Art

U.S. Pat. No. 3,459,070 discloses a wheel drive mechanism which is useful for driving vehicles in a slow speed, high torque mode such as needed in many agricultural environments. The mechanism disclosed in the U.S. Pat. No. 3,459,070 patent requires partial disassembly to prepare the vehicle for high speed, over-the-highway movement; such disassembly is time consuming, requiring approximately five minutes per wheel, and because it entails total removal of a gear, exposes the mechanism to admission of deleterious matter, should the removed gear be dropped in sand or dirt.

There is a hub manufactured by Warn Industries of Kent, Washington which has a manually rotatable member of the wheel hub to disengage the wheel from the axle. Such hub is widely used in the front wheels of four wheel drive vehicles and, as far as is known, employs a clutch which is engaged or disengaged by rotation of such member.

A hub similar to the above noted Warn Hub is manufactured by Ford Motor Company of Dearborn, Mich., such hub having two members with cooperating protuberances which are moved axially with respect to one another to engage or disengage such protuberances.

A torque hub drive manufactured by Fairfield Manufacturing Company of Lafayette, Ind., includes a cover which is retained in place by headed bolts and which can be removed by removing the bolts and the cover, reinstalling the cover at a different position and reinstalling the headed bolts to retain the cover in the different position, all of which requires substantial time.

SUMMARY OF THE INVENTION

The embodiment of the invention that is disclosed in more detail hereinafter is shown incorporated into the wheel drive mechanism described in the U.S. Pat. No. 3,459,070 patent cited above. According to the invention, the outer sun gear that constitutes a part of the planetary gear system is formed with an axially projecting shoulder for effecting engagement of the sun gear for movement in an axial direction. An actuator sleeve engages one race of a bearing, the other race of which engages the sun gear shoulder. The actuator sleeve extends into a housing that is accessible from the exterior of the hub where there is provided mechanism for moving the actuator sleeve and the sun gear between an inner, engaged position and an outer, disengaged position.

The mechanism for so positioning the actuator sleeve employs a manually rotatable spring loaded member which functions to move the actuator sleeve between its extreme positions. The rotatable member has a helical camming surface thereon which cooperates with the actuator sleeve to cause longitudinal or axial movement of the sleeve in response to rotation of the member.

Within the actuator sleeve and the housing therefor is a compression spring which biases the sun gear into the inner, engaged position. In moving the sun gear to the outer disengaged position energy is stored in the spring to assure and facilitate reengagement of the sun gear. The mechanism is constructed so that when the actuator sleeve is rotated to a position to permit the spring force to bias the sun gear toward an engaged position, the spring force is sustained without operator attention even when the sun gear teeth are not aligned with the spaces between the teeth of the planet pinion gears. This characteristic assures that meshing of the gears will promptly occur when rotation is produced in the planet pinion gears. Moreover, the housing includes an outer bearing for supporting the outer extremity of the drive shaft that supports the sun gear, so as further to facilitate smooth reengagement of the sun gear with the planetary pinion gear.

The foregoing together with other objects, features and advantages of the invention will be more apparent after referring to the following specification and the accompanying drawings.

BRIEF DESCRIPTION OF THE DRAWINGS

FIG. 2 is a fragmentary perspective view of the mechanism of FIG. 1 showing the sun gear in engagement with the planetary pinion gear.

FIG. 3 is a view similar to FIG. 2 showing the sun gear disengaged from the planetary pinion gear.

FIG. 4 is perspective view of an inner portion of a housing for the wheel drive mechanism.

DETAILED DESCRIPTION OF THE PREFERRED EMBODIMENT

Figure 1:
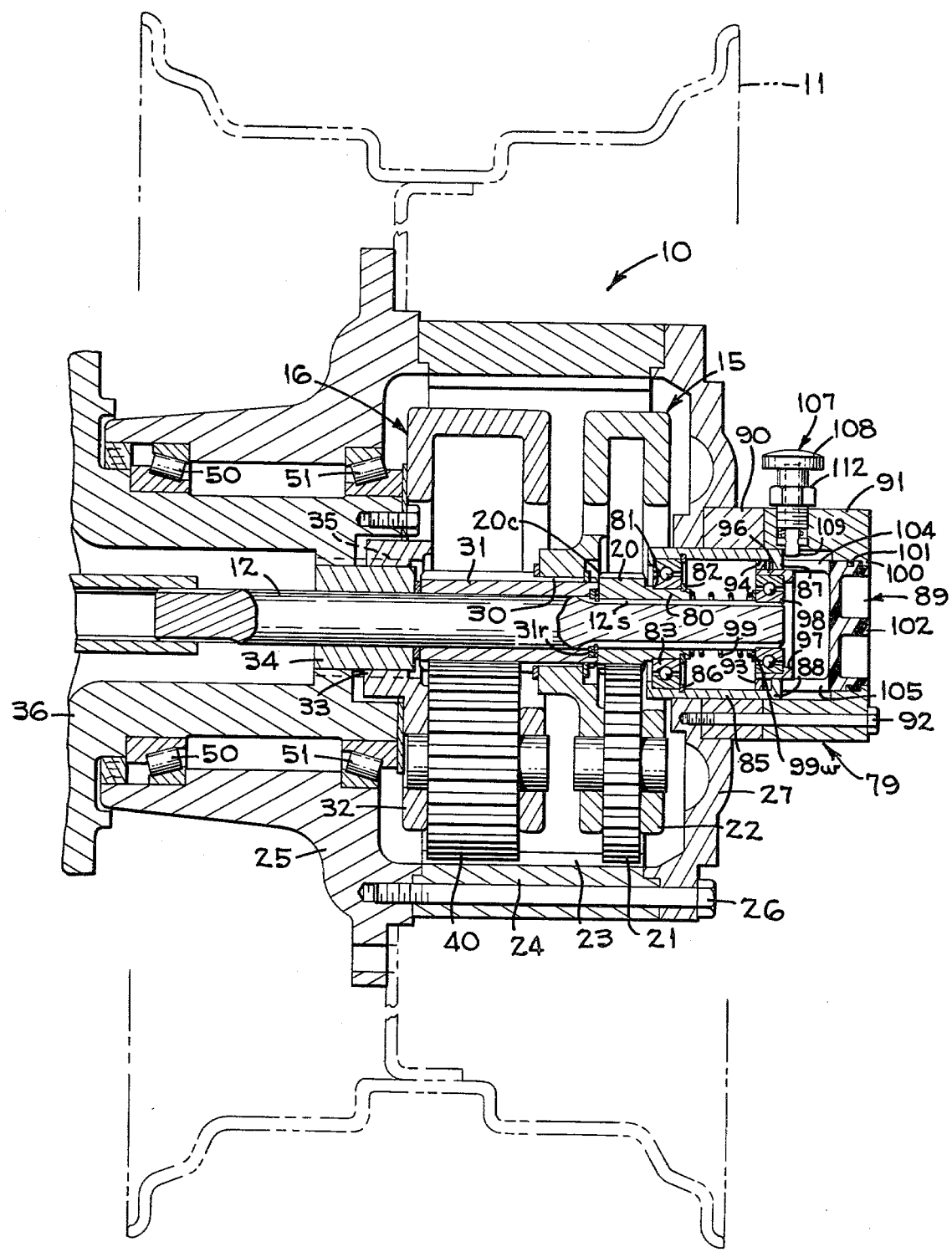
FIG. 1 is a cross-sectional elevation view of a diametrical plane of a wheel drive mechanism incorporating the present invention.

The disclosure of the above cited U.S. Pat. No. 3,459,070 is incorporated hereinto by this reference. To reduce the length of the succeeding description and to facilitate cross reference between the present disclosure and that of the U.S. Pat. No. 3,459,070 patent, identical reference characters are employed for identifying corresponding parts. Referring to FIG. 1, reference numeral 10 indicates a planetary transmission mounted within a wheel 11 so as to drive the wheel in a low speed, high torque mode. Power is supplied to the transmission by a drive shaft 12, the left-hand end (as viewed in FIG. 1) of which is driven by an internal combustion engine, a hydraulic motor, or like power source.

Planetary transmission 10 includes an outer planetary gear set 15 and an inner planetary gear set 16. The outer planetary gear set includes a driving sun gear 20 which is drivingly connected to and mounted on the outer end of drive shaft 12. The outer end of drive shaft 12 includes an elongate splined portion 12s and the central opening through sun gear 20 is similarly splined to establish a driving connection between the shaft and the sun gear and to permit the sun gear to move axially of the shaft.

Sun gear 20 drives a plurality of planet pinion gears 21 which are typically three or more in number and are mounted on a planetary carrier 22. Planet pinion gears 21 also mesh with a ring gear 23 which is formed on the interior surface of a drum 24. Drum 24 is attached to a rotatable wheel support 25 by means of bolts 26; rotatable wheel support 25 includes an outwardly extending aperatured flange to which wheel 11 is attached in a conventional manner. Bolts 26 also retain in place an end cover 27 in the center of which is mounted a housing 79 which is constructed in accordance with the present invention and will be described in detail hereinafter. End cover 27 is machined to form a surface against which housing 79 seats so that the housing is axially aligned with shaft 12.

Planetary carrier 22 is splined at 30 to a spur gear sleeve that forms a spur gear 31. Spur gear 31 is a component of inner planetary gear set 16. The sleeve of which spur gear 31 is a part defines a central bore sized to rotate freely on shaft 12. The sleeve is prevented from moving axially to the right by a thrust washer and locking ring assembly indicated at 31r.

A gear support or carrier 32 constitutes a part of inner planetary gear set 16 and serves as a reaction element for outer planetary gear set 15. Gear support 32 has splines 33 which engage splines 35 on a drive sleeve 34. Drive sleeve 34 is rigidly attached to a fixed wheel support 36 which in turn is rigidly attached to the vehicle on which the drive mechanism is mounted. Bearings 50 and 51 support wheel support 25 for rotation on fixed wheel support 36. Planetary carrier 32 supports a plurality of pinion gears 40 which mesh with spur gear 31 and with ring gear 23. Thus pinion gears 40 provide a drive input to ring gear 23, the gear support 32 being held stationary by engagement with drive sleeve 34. It will be seen that as sun gear 20 drives carrier 22 of the outer planetary gear set and thereby drives spur gear 31 of the inner planetary gear set, the pinions 40 will drive ring gear 23 and wheel 11.

In accordance with the present invention, sun gear 20 is formed with an integral axially extending bearing support sleeve 80 which has an outer diameter less than that of sun gear 20 and forms a bearing shoulder 81 which is spaced from the face of the sun gear. At the extremity of bearing support sleeve 80 remote from shoulder 81 is a groove for receiving a retaining ring 82, the inner race of a ball bearing 83 being disposed between the shoulder and the retaining ring. Because shoulder 81 is spaced from the face of the sun gear, the outer race of bearing 83 is clear of the face of the sun gear. At the portion of sun gear 20 opposite from support sleeve 80, the teeth of the sun gear are chamfered at 20c to facilitate axial movement of the sun gear into engagement with planet pinion gears 21.

For engaging the outer race of ball bearing 83 there is an annular abutment 84 which is integral with and extends radially inward from a cylindrical actuator sleeve 85. Actuator sleeve 85 defines a cylindrical bore sized to receive the outer race of bearing 83 therein and is internally grooved at an appropriate distance from annular abutment 84 to receive a retainer ring 86. The outer race of bearing 83 is captured between annular abutment 84 and retaining ring 86. Thus axial movement of actuator sleeve 85 will impart corresponding movement to sun gear 20 without impeding rotation thereof.

Actuator sleeve 85 at the end opposite annular abutment 84 defines two diametrically opposite inwardly extending fingers 87 and 88.

Fingers 87 and 88 cooperate with a cammed actuator 89 which is rotatably supported within housing 79. Housing 79 is formed by an inner portion 90 and an outer portion 91 which have a plurality of aligned bores to receive bolts 92 so as to retain the housing onto end cover 27. Inner housing portion 90 has on the outer or right-hand end thereof as viewed in the drawings an integral wall 93 which extends radially inward from the main body of the inner housing portion. Wall 93 is provided with diametrically spaced openings 94 through which fingers 87 and 88 of actuator sleeve 85 extend. The outer face of wall 93 forms a bearing surface for the inner end 95 of cammed actuator 89 so that the cammed actuator is rotatable and is fixed against inward axial movement. Extending axially outward from wall 93 is a cylindric wall portion 96 at the outer extremity of which is a radially inward projecting lip 97. Cylindric wall portion 96 and lip 97 support the outer race of a ball bearing 98 which is press fitted therein. The inner race of bearing 98 is engaged by one end of a compression spring 99 through a spring washer 99w which serves to avoid impairment by the spring of relative rotation of the two bearing races. The inner race of ball bearing 98 supports the outer end of shaft 12 and thus affords stability thereto. Compression spring 99 circumscribes splined shaft portion 12s, and the end of the spring opposite ball bearing 98 bears against sun gear sleeve 80.

Outer housing portion 91 is centrally bored to accommodate and support cammed actuator 89. Extending into the bore at the outer extremity of outer portion 91 is a lip 100 which cooperates with a complemental groove in the cammed actuator to capture the cammed actuator within the bore. Inward of the complemental groove is an O-ring seal 101 for excluding deleterious matter from the interior of housing 79 and for retaining lubricant within the housing. As can be seen in FIGS. 2 and 3, cammed actuator 89 has on the outer exposed surface thereof a diametrically extending gripping rib 102 which affords a finger grip to effect rotation of the actuator. Inward of the outer extremity of cammed actuator 89 is an integral cylindric skirt 103 which defines a pair of helically oriented camming surfaces 104 and 105. As can be seen in FIGS. 2 and 3, helical camming surface 104 cooperates with finger 87 and helical camming surface 105 cooperates with finger 88 so that in response to rotation of the cammed actuator in the direction designated by arrow A in FIG. 2, actuator sleeve 85 is moved outward (to the right as viewed in the drawings) and effects corresponding movement of sun gear 20. During such movement energy is stored in spring 99. As can be seen in FIG. 2, the outer axial extremity of camming surface 104 has a depression 106 which is oriented substantially perpendicular to the direction of movement of actuator sleeve 85. The outer extremity of camming surface 105 has a similar depression, not shown. Accordingly, when the camming member 89 is rotated to the position shown in FIG. 3, fingers 87 and 89 enter the depressions and retain sun gear 20 out of engagement with planetary pinion 21 notwithstanding vibrations to which the equipment is subjected during high speed highway travel.

As can be seen most clearly in FIGS. 2 and 3, the excisions in cylindric skirt 103 of actuator 89 form spaces axially outward of camming surfaces 104 and 105. The excisions are of generally triangular shape and are bounded by circumferentially oriented surfaces S opposite camming surfaces 104 and 105. The maximum axial distance between surfaces S and the camming surfaces exceeds the distance of travel of sun gear between the engaged and disengaged positions. Accordingly, if actuator 89 is rotated from the disengaged position of FIG. 3 to the engaged position of FIG. 2 and if the teeth of sun gear 20 are not aligned with spaces between the teeth of all planet pinion gears 21, subsequent engagement of gears 20 and 21 occurs when rotation of planet pinion gears occurs and without further operation attention.

For locking actuator sleeve 85 in the inward position at which sun gear 20 meshes with planetary pinion 21 there is a latch mechanism 107 mounted on housing 79. Latch mechanism 107 includes an externally accessible finger grip or knob 108 to which a radially extending locking pin 109 is rigidly fastened. Spaced slightly above the inner extremity of locking pin 109 is a cross pin 110 against which one end of a compression spring 111 bears. Compression spring 111 circumscribes locking pin 109 and the outer end thereof bears against the surface of a threaded plug 112 which retains locking mechanism 107 within housing portion 91. An O-ring (not shown) circumscribes locking pin 109 within the body portion of latch mechanism 107 through which it extends, and there is an O-ring or gasket between plug 112 and the exterior surface of housing portion 91; these form sealing means to exclude dirt from the mechanism and to retain lubricant therein.

As can be seen in FIG. 1 the inner extremity of locking pin 109, i.e., the portion inward of cross pin 110, bears against the outward axial extremity of finger 87, thus to prevent outward movement of sun gear 20 and disengagement thereof from pinion 21. When outward movement of the sun gear is desired, knob 108 can be pulled radially outward against the force of spring 111, and while there manually retained, cammed actuator 89 can be rotated. When the outer extremity of finger 87 moves beyond the inner end of locking pin 109, knob 108 can be released and the mechanism will assume the position shown in FIG. 3 at which the inner end of the locking pin bears against the surface of the actuator sleeve 85.

Apparatus embodying the present invention can be readily adapted to wheel drive mechanisms of the type shown in the above cited U.S. Pat. No. 3,459,070 patent. It will be appreciated that shaft 12 in the present disclosure is longer than the similarly identified shaft shown in the U.S. Pat. No. 3,459,070 patent, the extra length including splined portion 12s. Thus the shaft must be replaced in adapting the invention to existing equipment. Additionally, a cover 28 of the U.S. Pat. No. 3,459,070 patent, which is not shown in the drawings appended hereto and which is installed in the central opening of end cover 27, is replaced by housing 79. Notwithstanding the replacement of the original shaft in the equipment by a shaft of greater length, alignment between sun gear 20 and planet pinion gears 21 is achieved because ball bearing 98 supports the outer end of the shaft, the outer race of the ball bearing being supported by cylindric portion 96 of inner housing portion 90. It will thus be appreciated that the present invention can be readily incorporated into existing wheel drive mechanisms without disabling for an appreciable time the equipment on which the mechanism is installed.

In operation and with the mechanism in the position shown in FIG. 2, power is delivered through the planetary gear mechanism to wheel 11. Notwithstanding high loading and severe vibration, sun gear 20 remains engaged with planetary pinion gear 21. Such is the case because locking pin 109 engages the axial extremity of finger 87 of actuator sleeve 85, which through retaining ring 86, ball bearing 83, and shoulder 81 fixes the sun gear against outward axial movement. When it is desired to disengage the planetary gear mechanism to facilitate high speed movement over the highway, knob 108 is pulled out to disengage the inner end of locking pin 109 from engagement with actuator sleeve 85. This permits cammed actuator 89 to be rotated by grasping rib 102 and rotating the actuator in a clockwise direction indicated by arrow A in FIG. 2. Rotation of cammed actuator 85 effects sliding movement of camming surfaces 104 and 105 with respect to fingers 87 and 88, respectively, so that the fingers as well as actuator sleeve 85 are moved axially outward in response to such rotational movement. Such causes corresponding movement of annular abutment 84, bearing 83, retaining ring 82 and sun gear 20 into a disengaged position as shown in FIG. 3. At the extreme clockwise position of cammed actuator 89, fingers 87 and 88 are engaged with depressions 106 so that sun gear 20 remains in the disengaged position of FIG. 3 notwithstanding vibration and impacts. When the equipment reaches its destination it can be readied for slow speed, high torque movement simply by reversing the above described steps, that is, by rotating cammed actuator 89 in a counterclockwise position so as to permit the force stored in spring 99 to return sun gear 20 into engagement with pinion 21 if the sun gear teeth are aligned with the spaces between the teeth of planet pinion gears 21. The presence of chamfers on the teeth of sun gear 20 permits engagement in the presence of slight misalignment. In cases where the teeth of sun gear 20 and planet pinion gears 21 are in substantial alignment so as to preclude immediate engagement or meshing, rotation of actuator 89 moves camming surfaces 104 and 105 away from fingers 87 and 88. The fingers do not move because contact between the teeth of gears 20 and 21 prevents such movement. Rotative movement of actuator 89 is not prevented, however, because surface S which bounds the excision that forms camming surfaces 104 and 105 extends in a circumferential direction. When power is subsequently applied to shaft 12, planet pinion gears 21 rotate to permit meshing of sun gear 20 with the planet pinion gears in response to the force stored in spring 99. When the sun gear reaches the position shown in FIG. 2, spring 111 moves latch mechanism 107 into a locking position which can be visually verified by noting that knob 108 has returned to its innermost position.

Cammed actuator 89 can be fabricated of polyethylene, steel or other material of suitable strength. Camming surfaces 104 and 105 are configured in the exemplary design so that rotation of the cammed actuator through an arc of approximately 140° moves sun gear 20 between an engaged position and a disengaged position. Such exemplary design is adapted for installation on an agricultural vehicle having a plurality of driven wheels. All driven wheels can be engaged or disengaged in about one minute in contrast with the prior art system which requires approximately five minutes per wheel. Additionally, the system can be disengaged without removing any parts.

Thus it will be seen that the present invention provides a quick disengagement apparatus which can be quickly adapted to existing equipment, which is simple and positive in operation and which affords secure positioning in either the engaged or disengaged position. Although one embodiment of the invention has been shown and described, it will be obvious that other adaptations and modifications can be made without departing from the true spirit and scope of the invention.

What is claimed is:

1. In a wheel drive mechanism of the class for installation in a vehicle wheel hub for transmitting power from a driven shaft supported centrally of the hub to the wheel, said mechanism having a sun gear mounted on the shaft for rotation therewith, a planetary gear set having at least one pinion for meshing with the sun gear in driven relation thereto, a vehicle wheel hub geared to said planetary gear for rotating said wheel, said sun gear operably detachable from said planetary gear; an improved sun gear comprising in combination: a second shaft joined to said driven shaft at one end, having an elongated splined portion formed on the other end; said sun gear having a splined opening for engagement with said splined portion of said second shaft so as to be moveable longitudinally of the shaft into and out of engagement with the pinion, means for resiliently biasing said sun gear longitudinally of said splined portion to a position at which said sun gear meshes with said pinion, and means accessible exterior of said hub for moving said sun gear longitudinally of said splined portion and for rotative movement independent of said splined portion against said biasing means for selectively disengaging said sun gear from said pinion.

2. In a wheel drive mechanism of the class for installation in a vehicle wheel hub for transmitting power from a driven shaft supported centrally of the hub to the wheel, said mechanism having a sun gear mounted on the shaft for rotation therewith, a planetary gear set having at least one pinion for meshing with the sun gear in driven relation thereto, the improvement comprising in combination: means defining an elongated splined portion of said shaft; said sun gear having a splined opening for engagement with said splined portion so as to be moveable longitudinally of the shaft into and out of engagement with the pinion; means for resiliently biasing said sun gear longitudinally of said splined portion to a position at which said sun gear meshes with said pinion; an engaging means with a finger disposed axially outward of said sun gear; means for selectively locking said sun gear in engagement with said pinion, said locking means including a pin supported for radial movement in the path of said finger, biasing means for biasing said pin into the path of movement of said finger and means accessible from the exterior of said mechanism for moving said pin outward against said biasing means and out of the path of said finger; and means accessible exterior of said hub for moving said sun gear longitudinally of said splined portion against said biasing means for selectively disengaging said sun gear from said pinion.

3. In a wheel drive mechanism of the class for installation in a vehicle wheel hub for transmitting power from a driven shaft supported centrally of the hub to the wheel, said mechanism having a sun gear mounted on the shaft for rotation therewith, a planetary gear set having at least one pinion for meshing with the sun gear in driven relation thereto, the improvement comprising in combination: means defining an elongated splined portion of said shaft; said sun gear having a splined opening for engagement with said splined portion so as to be moveable longitudinally of the shaft into and out of engagement with the pinion; means for resiliently biasing said sun gear longitudinally of said splined portion to a position at which said sun gear meshes with said pinion; a housing exterior of said drive mechanism and coaxial with said shaft, said housing having a retainer portion outward of said sun gear in substantial alignment with the outer end of said shaft and a bearing between said shaft and said retainer portion for supporting the free end of said shaft, said biasing means being disposed between said sun gear and said bearing; and means accessible exterior of said hub for moving said sun gear longitudinally of said splined portion against said biasing means for selectively disengaging said sun gear from said pinion.

4. In a wheel drive mechanism for installation in a vehicle wheel hub for transmitting power from a driven shaft supported centrally of the hub to the wheel, said mechanism being of the type having a sun gear mounted on the shaft for rotation therewith and a planetary gear set having at least one pinion for meshing with the sun gear in driven relation thereto, an improved mechanism for disengaging the sun gear from the pinion for high speed travel comprising an elongate splined portion formed on said shaft, said sun gear having a splined opening for engagement with said splined portion so as to be moveable longitudinally of the shaft into and out of engagement with the pinion, means for resiliently biasing said sun gear longitudinally of said splined portion to an engaged position at which said sun gear meshes with said pinion, and means engaging said sun gear for axial movement in unison therewith and for rotative movement independent thereof, said engaging means having rigid therewith a plurality of fingers extending axially outward of said sun gear, said fingers at a location remote from said sun gear having cam members that extend radially inward of said fingers, a cylindrical member disposed radially inward of said fingers and having a plurality of helically oriented camming surfaces disposed for coaction with said cam members, means supporting said cylindrical member for rotation between an engaged position at which said camming surfaces reside in an axial position to afford engagement between said sun gear and said pinion and a disengaged position at which said camming surfaces reside in an axial position to afford disengagement between said sun gear and said pinion, said biasing means storing energy in said disengaged position, said cylindric member having an externally accessible portion for affording manual rotation thereof between said engaged position and said disengaged position.

* * * * *